(12) United States Patent
Wang et al.

(10) Patent No.: US 12,508,974 B2
(45) Date of Patent: Dec. 30, 2025

(54) SYSTEMS AND METHODS FOR SECURING CARGO USING INFLATABLE PANELS

(71) Applicant: Toyota Motor Engineering & Manufacturing North America, Inc., Plano, TX (US)

(72) Inventors: Weiling Wang, Livonia, MI (US); Yuyang Song, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 404 days.

(21) Appl. No.: 18/108,087

(22) Filed: Feb. 10, 2023

(65) Prior Publication Data
US 2024/0270149 A1   Aug. 15, 2024

(51) Int. Cl.
*B60P 7/00*  (2006.01)
*B60P 7/06*  (2006.01)
*B60P 7/135* (2006.01)

(52) U.S. Cl.
CPC ............... *B60P 7/065* (2013.01); *B60P 7/135* (2013.01)

(58) Field of Classification Search
CPC ................................. B60P 7/065; B60P 7/135
USPC ............................................. 410/119, 125
See application file for complete search history.

(56) References Cited

U.S. PATENT DOCUMENTS

| | | | |
|---|---|---|---|
| 3,696,449 A * | 10/1972 | Smith | A47D 13/063 5/118 |
| 6,457,921 B1 | 10/2002 | Freeman | |
| 6,537,003 B1 * | 3/2003 | Rostoker | B60P 7/065 410/125 |
| 8,167,520 B2 * | 5/2012 | Stephens | B60R 7/00 410/119 |
| 10,688,907 B2 | 6/2020 | Freeman et al. | |
| 2014/0255122 A1 * | 9/2014 | Radosevic | G05D 16/163 137/225 |
| 2022/0135146 A1 | 5/2022 | Thole et al. | |
| 2023/0202375 A1 * | 6/2023 | Chmielewski | B60P 7/16 |

FOREIGN PATENT DOCUMENTS

GB        2573383 A       6/2019

* cited by examiner

*Primary Examiner* — Steven O Douglas
(74) *Attorney, Agent, or Firm* — Christopher G. Darrow; Darrow Mustafa PC

(57) ABSTRACT

System, methods, and other embodiments described herein relate to securing cargo in a cargo area of a vehicle using inflatable panels. In one embodiment, a method includes acquiring sensor data about a cargo area of a vehicle from at least one sensor, identifying a presence and a location of an item in the cargo area according to the sensor data, and inflating an inflatable panel to secure the item in the cargo area.

20 Claims, 4 Drawing Sheets

SYSTEMS AND METHODS FOR SECURING CARGO USING INFLATABLE PANELS

TECHNICAL FIELD

The subject matter described herein relates, in general, to securing cargo within a vehicle and, more particularly, to securing cargo in a cargo space of a vehicle using inflatable panels, which prevents the cargo from moving.

BACKGROUND

When cargo is placed in a cargo space of a vehicle, such as a truck bed or trunk, the cargo is free to move and slide as the vehicle travels. When cargo is free to move as the vehicle travels, cargo can break, become damaged, or damage the cargo area of the vehicle. To prevent cargo sliding and breakage during travel, users take inconvenient actions including taking slow turns, travelling at slow speeds, or holding the cargo as they drive. Moreover, existing mechanisms for securing cargo are cumbersome and include strapping cargo into place, placing cargo in pockets or nets, and placing cargo in designated compartments while also not necessarily securing cargo that is too large or small to fit into designated spaces. These existing mechanisms also require users to install equipment such as straps, pockets, nets, and compartment spaces within fixed areas of a cargo space, and additionally, these mechanisms require users to manually manipulate the equipment to secure the cargo. Further, these existing mechanisms may damage the cargo by squeezing the cargo or by requiring the cargo to be placed in an undesirable orientation. Additionally, users cannot monitor the cargo area while the vehicle is traveling due to obstructed views, paying attention to the road, etc. Accordingly, even if users successfully secure cargo in the cargo area at the beginning of a trip, a user has no way of knowing whether the cargo has moved or become unstable while traveling, and it may not be feasible for the user to re-secure the cargo while the vehicle is moving.

SUMMARY

Example systems and methods described herein relate to improving the prevention of cargo movement during vehicle travel. As previously noted, when cargo is placed in a space within a vehicle, the cargo can move when the vehicle is underway, which may lead to cargo and vehicle damage. As a result, drivers may change driving maneuvers to prevent unsecured cargo from moving and install various mechanisms that require manual manipulation to secure the cargo during travel. Further, it may not be feasible for users to monitor the cargo and adjust equipment that may be used to hold the cargo in place while driving.

Therefore, in one embodiment, an inflation system is disclosed that improves securing cargo in a vehicle by using inflatable panels that expand into contact with cargo to secure cargo in a cargo area. In one approach, a system acquires sensor data about the cargo area of the vehicle. The cargo area may be a space within a vehicle capable of housing cargo, such as a trunk, truck bed, frunk, etc. The cargo area includes, in one configuration, one or more inflatable panels removably attached to the floor of the cargo area. For example, the floor may include attachment points or housings for receiving the inflatable panels. In one arrangement, the housings include a connection point, such as a tube or channel, to couple an inflatable panel to a supply device, such as a compressor, air tank, or pump. Accordingly, in one arrangement, a user selectively moves the location of an inflatable panel by disconnecting the inflatable panel from a first housing and connecting the inflatable panel to a second housing.

In any case, the system may acquire sensor data from sensors within the cargo area. In one embodiment, the system processes the sensor data to identify a presence and a location of an item in the cargo area. In response to identifying an item in the cargo area, the system secures the item by, in one or more arrangements, inflating an inflatable panel. The system may secure the item by inflating an inflatable panel that is the shortest distance to the item. For example, if the item is on the farthest left side of the cargo area, the system determines that the inflatable panel on the far-left side of the cargo area is the closest distance and inflates the far-left inflatable panel.

As a further aspect, the system monitors the state of the item by monitoring the cargo area while the vehicle is underway. Responsive to identifying that the item is loose or moving, the system, in one arrangement, inflates at least one additional inflatable panel or adapts inflation of a previously inflated panel. In this way, the system improves the prevention of cargo movement while a vehicle is underway by inflating inflatable panels in the cargo area.

In one embodiment, an inflation system is disclosed. The inflation system includes one or more processors and a memory communicably coupled to the one or more processors. The memory stores a control module including instructions that when executed by the one or more processors cause the one or more processors to acquire sensor data about a cargo area of a vehicle from at least one sensor, identify a presence and a location of an item in the cargo area, and inflate an inflatable panel to secure the item in the cargo area.

In one embodiment, a non-transitory computer-readable medium including instructions that when executed by one or more processors cause the one or more processors to perform one or more functions is disclosed. The instructions include instructions to acquire sensor data about a cargo area of a vehicle from at least one sensor, identify a presence and a location of an item in the cargo area, and inflate an inflatable panel to secure the item in the cargo area.

In one embodiment, a method for securing items in a cargo area of a vehicle is disclosed. In one embodiment, the method includes acquiring sensor data about a cargo area of a vehicle from at least one sensor, identifying a presence and a location of an item in the cargo area, and inflating an inflatable panel to secure the item in the cargo area.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
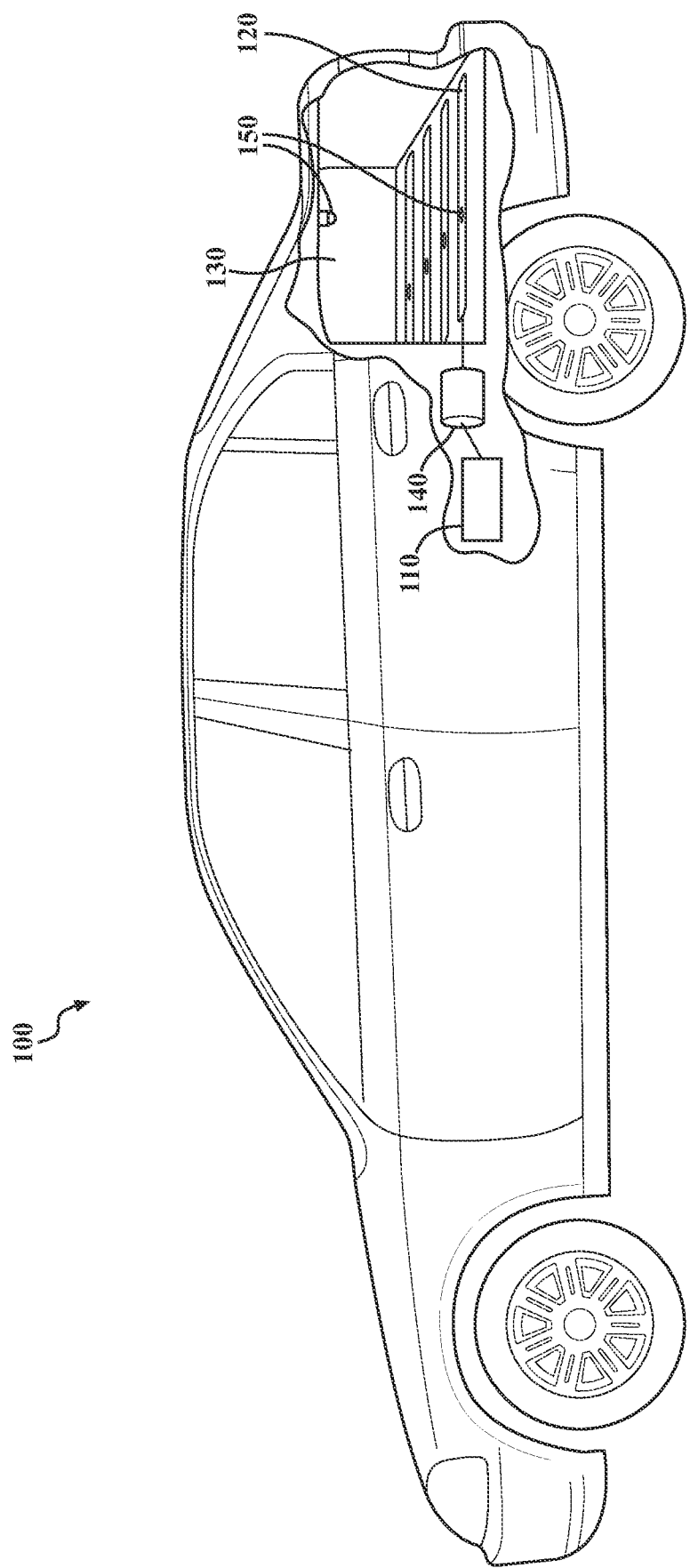
FIG. 1 illustrates one embodiment of a vehicle within which systems and methods disclosed herein may be implemented.

Systems, methods, and other embodiments associated with improving the prevention of cargo movement while a vehicle is underway by expanding inflatable panels in the cargo area are disclosed herein. As previously discussed, when cargo is placed in a space within a vehicle, the cargo can move when the vehicle is underway, which may lead to cargo damage, cargo movement, and vehicle damage. To counteract damage to the cargo, drivers may change driving maneuvers to prevent unsecured cargo from moving and install various mechanisms that require manual manipulation, such as cables, nets, pockets, etc., to secure the cargo during travel. Further, it may not be feasible or safe for users to monitor the cargo and adjust equipment that may be used to hold the cargo in place while driving.

Therefore, in one embodiment, an inflation system is disclosed that improves securing cargo in a vehicle by using inflatable panels to prevent the cargo from moving while the vehicle is underway. In one approach, a system acquires sensor data about the cargo area of the vehicle. The cargo area is a space within a vehicle capable of housing cargo, such as a trunk, truck bed, frunk, etc. Sensors may be located, for example, in the cargo area (e.g., on a ceiling of the cargo area, in a wall of the cargo area, in a floor of the cargo area, etc.), within inflatable panels installed in the cargo area, or in a mobile device. The cargo area includes, in one configuration, one or more inflatable panels removably attached to the cargo area. For example, the floor of the cargo area may include attachment points or housings for receiving the inflatable panels. The attachment points or housings may be located in any open space of the floor, and in one embodiment, the attachment points or housings are evenly spaced across the floor of the cargo area. In one configuration, the attachment points or housings are located along the walls of the cargo area, in the corners of the cargo area, or on the ceiling of the cargo area. In one arrangement, the housings include a connection point, such as a tube or channel, to couple an inflatable panel to a supply device, such as a compressor, air tank, or pump. Accordingly, in one approach, a user can selectively move the location of an inflatable panel by disconnecting the inflatable panel from a first housing and connecting the inflatable panel to a second housing.

In any case, the system may acquire sensor data from sensors within the cargo area. Sensors may include cameras, radars, sonars, or any other sensors capable of detecting contents of the cargo area, the location of inflatable panels in the cargo area, motion in the cargo area, etc. In one embodiment, the system processes the sensor data to identify a presence and a location of an item in the cargo area. In response to identifying an item in the cargo area, the system secures the item by, in one or more arrangements, inflating an inflatable panel. The system inflates the inflatable panel by controlling the supply device to fill the inflatable panel with water, pre-condensed air, or compressed air to a pre-determined pressure. The system may secure the item by inflating an inflatable panel that is the shortest distance to the item. For example, if the item is on the farthest left side of the cargo area, the system determines that the inflatable panel on the far-left side of the cargo area is the closest distance to the item and inflates the far-left inflatable panel. Instead of utilizing the system to detect the location of the item and to inflate the inflatable panel, in one or more configurations, a user may control the supply device using a human machine interface (HMI), button switch, knob, etc., to manually inflate the inflatable panel.

As a further aspect, the system monitors the state of the item by monitoring the cargo area while the vehicle is underway. For example, the system may acquire motion data about the cargo area and process the motion data to determine whether the item is loose or secure. Responsive to identifying that the item is loose or moving, the system, in one arrangement, inflates at least one additional inflatable panel. Alternatively, or additionally, the system, in response to identifying that the item is loose, increases the pressure of the inflatable panel by controlling the supply device to fill the inflatable panel with additional water, pre-condensed air, or compressed air. In one arrangement, the system may stream sensor data about the cargo area, such as image and video data of the cargo area, onto a display in the vehicle. Accordingly, a user may monitor the cargo area using the display. If the user identifies that the item is loose or has otherwise moved, the user may generate an electronic input on an HMI within the vehicle or on a mobile device to cause the system to inflate an additional panel into contact with the item and/or to increase the pressure of the inflatable panel.

To secure the item while the vehicle is underway, the system, in one embodiment, generates a predicted state of the vehicle over a route, where the predicted state of the vehicle may include a speed, a steering angle, a braking maneuver, etc., the vehicle will execute along the route. The system may generate the predicted state of the vehicle by, for example, receiving navigation data associated with the vehicle or by acquiring and processing inertial measurement unit (IMU) data indicative of upcoming maneuvers the vehicle will execute. Based on the predicted state of the vehicle, the system determines a predicted movement of the item. For example, the system may generate a predicted state of the vehicle associated with the vehicle making a sharp right turn, and as such, the system determines that the item is likely to shift to the left of the vehicle.

In response to determining the predicted movement of the item, the system, in one embodiment, prevents the predicted movement from occurring by inflating at least one additional panel into contact with the item and/or by increasing the pressure of the inflatable panel. As an example, if the system determines that the item will shift left as a result of the generated predicted path of the vehicle, the system may inflate an additional inflatable panel on the left side of the item or increase the pressure of the inflatable panel to prevent the item from moving.

In one arrangement, when one or more additional objects are present, the system processes the sensor data to identify the one or more objects in the cargo area. Accordingly, to secure an additional object in the cargo area, the system inflates at least one additional inflatable panel to secure the additional object. As previously described, the system inflates an inflatable panel that is the shortest distance to the object to secure the object and may selectively inflate one or more inflatable panels based on the predictive state of the vehicle. In this way, the system improves the prevention of cargo movement while a vehicle is underway by inflating inflatable panels in the cargo area.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes a space to hold cargo.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1.

Some of the possible elements of the vehicle 100 are shown in FIG. 1 and will be described along with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an inflation system 110 that is implemented to perform methods and other functions as disclosed herein relating to improving prevention of cargo movement while the vehicle 100 is underway.

The vehicle 100 further includes one or more inflatable panels 120 located in a cargo area 130 of the vehicle 100. As used herein, a "cargo area" is a space in a vehicle where cargo may be placed, such as a truck bed, a space behind a seat of a vehicle, a frunk, or the like. In one or more implementations, the cargo area 130 is a trunk. In one configuration, the one or more inflatable panels 120 are made of a puncture-resistant material, such as nylon, a Kevlar-based material, etc. Accordingly, in one arrangement, the one or more inflatable panels 120 touch rigid surfaces in the cargo area 130 when a supply device 140 inflates the one or more inflatable panels 120 without puncturing.

The one or more inflatable panels 120 may be arranged in a configuration sufficient to secure items in the cargo area 130. For example, the one or more inflatable panels 120 may be fixed along the floor of the cargo area 130. As another example, the one or more inflatable panels 120 may be fixed in the walls of the cargo area 130 or at the corners of the cargo area 130. In one arrangement, the one or more inflatable panels 120 are removably attached to the floor, corners, or the walls of the cargo area 130. For example, the cargo area 130 may include attachment points or housings for receiving the one or more inflatable panels 120. The attachment points or housings may be located in any open space of the cargo area 130. The attachment points or housings may be evenly spaced in an arrangement of columns and/or rows along the floor, walls, and/or ceilings of the cargo area 130. As another example, the attachment points may be located in the corners of the cargo area 130. In one arrangement, a user can selectively move the location of an inflatable panel 120 by disconnecting the inflatable panel 120 from a first housing and connecting the inflatable panel 120 to a second housing. The attachment points or housings include, in one or more embodiments, apparatuses to receive the one or more inflatable panels 120, such as sliding rails, brackets, hooks, tie downs, etc.

In one arrangement, the housings include a connection point, such as a tube or channel, to couple the one or more inflatable panels 120 to the supply device 140. The supply device 140 may be any device capable of expanding the one or more inflatable panels 120, such as a compressor, air tank, or pump. The supply device 140 may be located in or external to the vehicle 100. As such, the location of the supply device 140 is, for example, within a panel of the vehicle 100, a trunk space, beneath a seat of the vehicle 100, or any space internal or external to the vehicle 100 that allows the supply device 140 to connect to the one or more inflatable panels 120.

The supply device 140 fills the one or more additional panels 120 with a supply capable of expanding the one or more inflatable panels 120, such as water, pre-bottled condensed air, or compressed air depending on the type of supply device 140. For example, if the supply device 140 is a compressor, the supply may be pre-bottled condensed air or compressed air. In one embodiment, if the supply device 140 is a fill valve, the supply may be water. In one configuration, if the supply device 140 is a pump, the pump may supply water or air to the one or more inflatable panels 120. The connection points located in the housings may be any device that allows air or water to flow into the one or more inflatable panels 120, such as a pipe, channel, tube, or the like. In one embodiment, the supply device 140 further includes a pressure sensor that informs the inflation system 110 of the pressure of the one or more inflatable panels 120.

The vehicle 100 includes one or more sensors 150 that acquire sensor data about the cargo area 130. The sensors 150 are, for example, cameras, radars, sonars, or any other sensor capable of acquiring sensor data indicative of the contents of the cargo area 130, the location of the one or more inflatable panels 120, and/or motion in the cargo area 130. In one embodiment, the sensors 150 are located in the cargo area 130. For example, the sensors 150 may be located in a ceiling, a floor, or a wall of the cargo area 130. In one configuration, the sensors 150 are located within the one or more inflatable panels 120. For example, the sensors 150 may be attached to or integrated into the one or more inflatable panels 120. In one arrangement, the sensors 150 may be located in a mobile device of a user. In any case, the sensors 150 are capable of acquiring sensor data about the cargo area 130.

Figure 2:
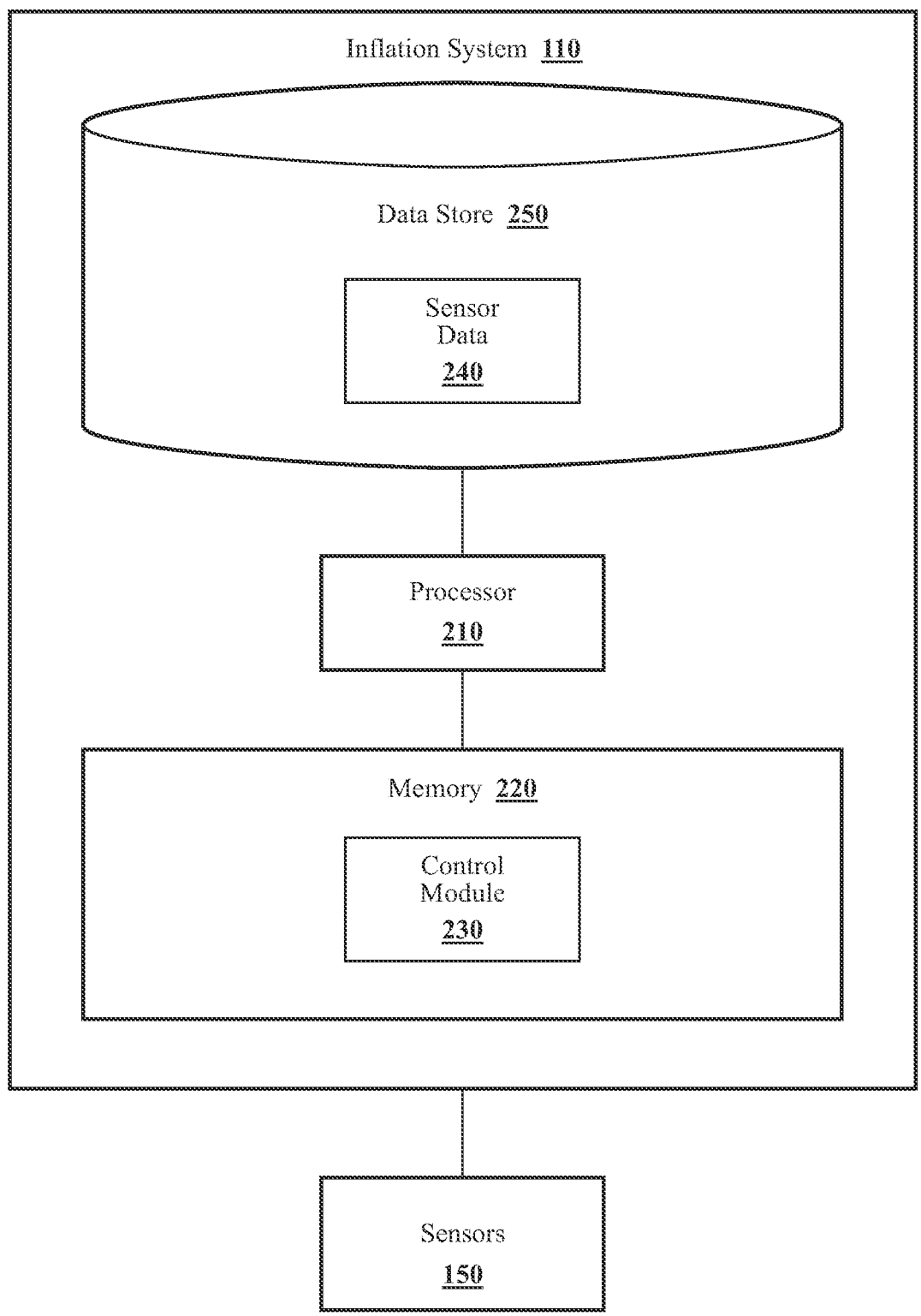
FIG. 2 illustrates one embodiment of an inflation system that is associated with securing cargo in a cargo area of a vehicle using inflatable panels.

With reference to FIG. 2, one embodiment of the inflation system 110 of FIG. 1 is further illustrated. The inflation system 110 is shown as including a processor 210 from the vehicle 100 of FIG. 1. Accordingly, the processor 210 may be a part of the inflation system 110, the inflation system 110 may include a separate processor from the processor 210 of the vehicle 100, or the inflation system 110 may access the processor 210 through a data bus or another communication path. In one embodiment, the inflation system 110 includes a memory 220 that stores a control module 230. The memory 220 is a random-access memory (RAM), read-only memory (ROM), a hard-disk drive, a flash memory, or other suitable memory for storing the control module 230. The control module 230 is, for example, computer-readable instructions that when executed by the processor 210 cause the processor 210 to perform the various functions disclosed herein.

The control module 230 generally includes instructions that function to control the processor 210 to receive data inputs from one or more sensors 150 of the vehicle 100. The inputs are, in one embodiment, observations about the cargo area 130 of the vehicle 100. As provided for herein, the control module 230, in one embodiment, acquires sensor data 240 that includes at least camera images. In further arrangements, the control module 230 acquires the sensor data 240 from further sensors such as a radar, sonar, and other sensors as may be suitable for identifying features about the cargo area 130. In addition to features about the cargo area 130, the sensor data 240 may also include, for example, information about contents of the cargo area 130, a presence and a location of an item in the cargo area 130, and so on.

Accordingly, the control module 230, in one embodiment, controls the respective sensors to provide the data inputs in the form of the sensor data 240. Additionally, while the control module 230 is discussed as controlling the various sensors 150 to provide the sensor data 240, in one or more embodiments, the control module 230 can employ other techniques to acquire the sensor data 240 that are either active or passive. For example, the control module 230 may passively sniff the sensor data 240 from a stream of electronic information provided by the various sensors to further components within the vehicle 100. Moreover, the control module 230 can undertake various approaches to fuse data from multiple sensors when providing the sensor data 240 and/or from sensor data acquired over a wireless communication link. Thus, the sensor data 240, in one embodiment, represents a combination of perceptions acquired from multiple sensors.

Moreover, in one embodiment, the inflation system 110 includes a data store 250. In one embodiment, the data store 250 is a database. The database is, in one embodiment, an electronic data structure stored in the memory 220 or another data store and that is configured with routines that can be executed by the processor 210 for analyzing stored data, providing stored data, organizing stored data, and so on. Thus, in one embodiment, the data store 250 stores data used by the control module 230 in executing various functions.

The control module 230, in one embodiment, is further configured to perform additional tasks beyond controlling the respective sensors to acquire and provide the sensor data 240. For example, the control module 230 includes instructions that cause the processor 210 to process the sensor data 240 into characteristics about the cargo area 130 and an item in the cargo area 130. In one arrangement, the control module 230 processes the sensor data 240 by using a machine learning algorithm embedded within the control module 230, such as a convolutional neural network (CNN), to perform semantic segmentation over the sensor data 240 from which the cargo area 130 and its contents are identified and extracted. Using the machine learning algorithm, the control module 230 provides an output with semantic labels identifying features about the cargo area 130 and the item represented in the sensor data 240. In one arrangement, the control module 230 processes the sensor data 240 by extracting features from acquired image, radar, ultrasonic, and/or video data. For example, the control module 230 may process image data to identify specific structures in the cargo area 130, such as the presence of the item, the location of the item, the dimensions of the item, the location of inflatable panels 120 in relation to the item, and so on.

In response to identifying the location and the presence of the item in the cargo area 130, the control module 230 inflates an inflatable panel 120 in the cargo area 130 to secure the item. In one embodiment, the control module 230 determines that the inflatable panel 120 is a shortest distance to the item in comparison to one or more additional inflatable panels 120 in the cargo area 130 and selects the inflatable panel 120 that is the shortest distance to the item to inflate the item. For example, if the item is on the far-left side of the cargo area 130 and the inflatable panels 120 in the cargo area 130 are evenly spaced in a row across the floor of the cargo area 130, the control module 230 determines that the inflatable panel 120 on the far-left side of the floor is the shortest distance to the item, and as such, the control module 230 inflates the far-left inflatable panel 120.

In one arrangement, the control module 230 inflates the inflatable panel 120 by controlling the supply device 140 to fill the inflatable panel 120 to a threshold pressure that is sufficient to secure the item. In one embodiment, the threshold pressure is based, at least in part, on the sensor data 240 indicative of the dimensions of the item. For example, in response to the control module 230 determining the dimensions of the item, the control module 230 sets a threshold pressure for the supply device 140 to fill the inflatable panel 120 to, where the threshold pressure is the pressure necessary to secure the item. Securing the item includes preventing the item from moving by, for example, tightly holding the item in place using the inflatable panel 120. In one embodiment, the threshold pressure is set by an input from a user. For example, the user may set the threshold pressure by entering an input on an HMI, pressing a button, flipping a switch, or the like within the vehicle 100, on a mobile device, or directly on the supply device 140. In one arrangement, the user selects the threshold pressure from a list of preset threshold pressures. For example, in one arrangement, the user has an option to fill the inflatable panel 120 to a level one threshold pressure, a level two threshold pressure, a level three threshold pressure, etc., where each subsequent level corresponds to a higher threshold pressure for the inflatable panel 120.

In one approach, the control module 230 may identify one or more additional objects in the cargo area 130. Accordingly, the control module 230, in one or more embodiments, inflates at least one additional inflatable panel 120 to secure the one or more objects. As previously discussed, the control module 230, in one configuration, determines which inflatable panel 120 is the shortest distance to an additional object and selects the inflatable panel 120 that is the shortest distance to the additional object to inflate. Moreover, the control module 230 inflates the additional inflatable panel 120 to a threshold pressure sufficient to secure the additional object in the cargo area 130.

In one embodiment, the control module 230 monitors a state of the item by monitoring the cargo area 130 while the vehicle 100 is underway. In one approach, the control module 230 monitors the state of the item by acquiring motion data about the cargo area 130 and processing the motion data to determine whether the item is loose or secure. The control module 230 may determine that the item is loose if the item is rattling, swaying, changing positions, or otherwise moving. In contrast, the control module 230 may determine that the item is secure if the item is still while the vehicle 100 is underway. Responsive to identifying that the item is loose or moving, the system, in one arrangement, inflates at least one additional inflatable panel 120 to secure the item. As an example, if the item is secured by an inflatable panel 120 but shifts laterally (i.e., the item is loose) when the vehicle 100 turns, the control module 230 inflates an inflatable panel 120 on the left and/or the right side of the item to prevent the item from shifting laterally. Alternatively, or additionally to inflating an additional inflatable panel 120, the control module 230, in response to identifying that the item is loose, increases the pressure of the inflatable panel 120 by controlling the supply device 140 to fill the inflatable panel with additional water, pre-condensed air, or compressed air. For example, if the item is rattling while the vehicle 100 is underway but is otherwise not moving, the control module 230 controls the supply device 140 to increase the pressure of the inflatable panel 120 until the item is not rattling.

In one arrangement, the control module 230 may stream sensor data 240 about the cargo area 130, such as image and video data of the cargo area 130, onto a display in the vehicle 100 or a mobile device. Accordingly, a user may monitor the cargo area 130 using the display. If the user identifies that the item is loose or has otherwise moved, the user may generate an electronic input on an HMI within the vehicle 100 or on a mobile device to cause the control module 230 to inflate an additional inflatable panel 120 and/or to increase the pressure of the inflatable panel 120. In one embodiment, the user selects which additional inflatable panel 120 in the cargo area 130 to inflate by generating an electronic input on an HMI. The user may also select the pressure to inflate the inflatable panel 120 to by generating an electronic input on an HMI, by generating an input on a knob, or the like.

In one embodiment, the control module 230 generates a predicted state of the vehicle 100 at separate points over a route. The predicted state of the vehicle 100 may include a speed, a steering angle, a braking maneuver, etc., the vehicle 100 will execute along the route. The control module 230 may generate the predicted state of the vehicle 100 by, for example, receiving navigation data associated with the vehicle 100. Navigation data includes, for example, data about a route the vehicle 100 is taking and/or a trajectory the vehicle 100 is planning to execute. In one approach, the control module 230 generates predicted states of the vehicle at inflection points along the route. Inflection points, in one embodiment, correspond to the vehicle 100 executing a maneuver that satisfies a threshold g-force applied to the item, where the threshold g-force is a g-force that results in movement of the item in the cargo area 130. As an example, if the navigation data indicates that the vehicle 100 will stop at a stop sign in one mile (i.e., where the stop is an inflection point), the control module 230 determines that the predicted vehicle state in one mile is a complete stop and that the state of the vehicle 100 leading up to the stop sign includes braking and decelerating of the vehicle 100 (i.e., where the braking and/or decelerating correspond to additional inflection points).

In one configuration, the control module 230 generates a near-future predicted state of the vehicle 100 by acquiring and processing inertial measurement unit (IMU) data indicative of upcoming maneuvers the vehicle 100 will execute. A near-future predicted state, in one embodiment, corresponds to the state of the vehicle 100 immediately proceeding a real-time maneuver (e.g., less than or equal to one minute, less than or equal to thirty seconds, less than or equal to ten seconds, etc., after executing a maneuver) as indicated by the IMU data. IMU data includes, in one or more arrangements, data, such as the acceleration of the vehicle 100, the speed of the vehicle 100, and the steering angle of the vehicle 100. For example, if the IMU data indicates that the vehicle 100 is slowing down, the control module 230 generates a predicted state of the vehicle 100 that corresponds to the vehicle 100 coming to a stop or executing a turning maneuver.

In one embodiment, the control module 230 generates the predicted state of the vehicle 100 in response to a user generating an input in the vehicle 100. In one approach, an input includes the user interacting with a turn signal of the vehicle 100. As an example, if the user engages the left turn signal, the control module 230 determines that the vehicle 100 will be turning left. An input may also include an electronic input from an HMI. For example, a user may indicate upcoming driving maneuvers on an HMI and based on the upcoming driving maneuvers, the control module 230 generates the predicted state of the vehicle 100.

Based on the predicted state of the vehicle 100, the control module 230 determines a predicted movement of the item according to the predicted state of the vehicle 100. Movement of the item can include lateral movement, longitudinal movement, or upward/downward movement. For example, the control module 230 may generate a predicted state of the vehicle 100 associated with the vehicle 100 making a sharp right turn, and as such, the control module 230 determines that the item is likely to shift to the left of the vehicle 100. As another example, the control module 230 may generate a predicted state of the vehicle 100 associated with the vehicle 100 braking, and as such, the control module 230 determines that the item is likely to shift towards a front end of the vehicle 100 in the cargo area 130. In response to determining the predicted movement of the item, the control module 230, in one embodiment, prevents the item from executing the predicted movement by inflating at least one additional inflatable panel 120 and/or by increasing the pressure of the inflatable panel 120. As an example, if the control module 230 determines that the item will shift left as a result of the generated predictive path of the vehicle 100, the control module 230 may inflate an additional inflatable panel 120 on the left side of the item or increase the pressure of the inflatable panel 120 to prevent the item from moving. As another example, if the control module 230 determines that the item will shift to a front end of the cargo area 130 as a result of the generated predicted path of the vehicle 100, the control module 230 inflates an additional inflatable panel 120 in front of the item and/or increases the pressure of the inflatable panel 120.

Figure 3:
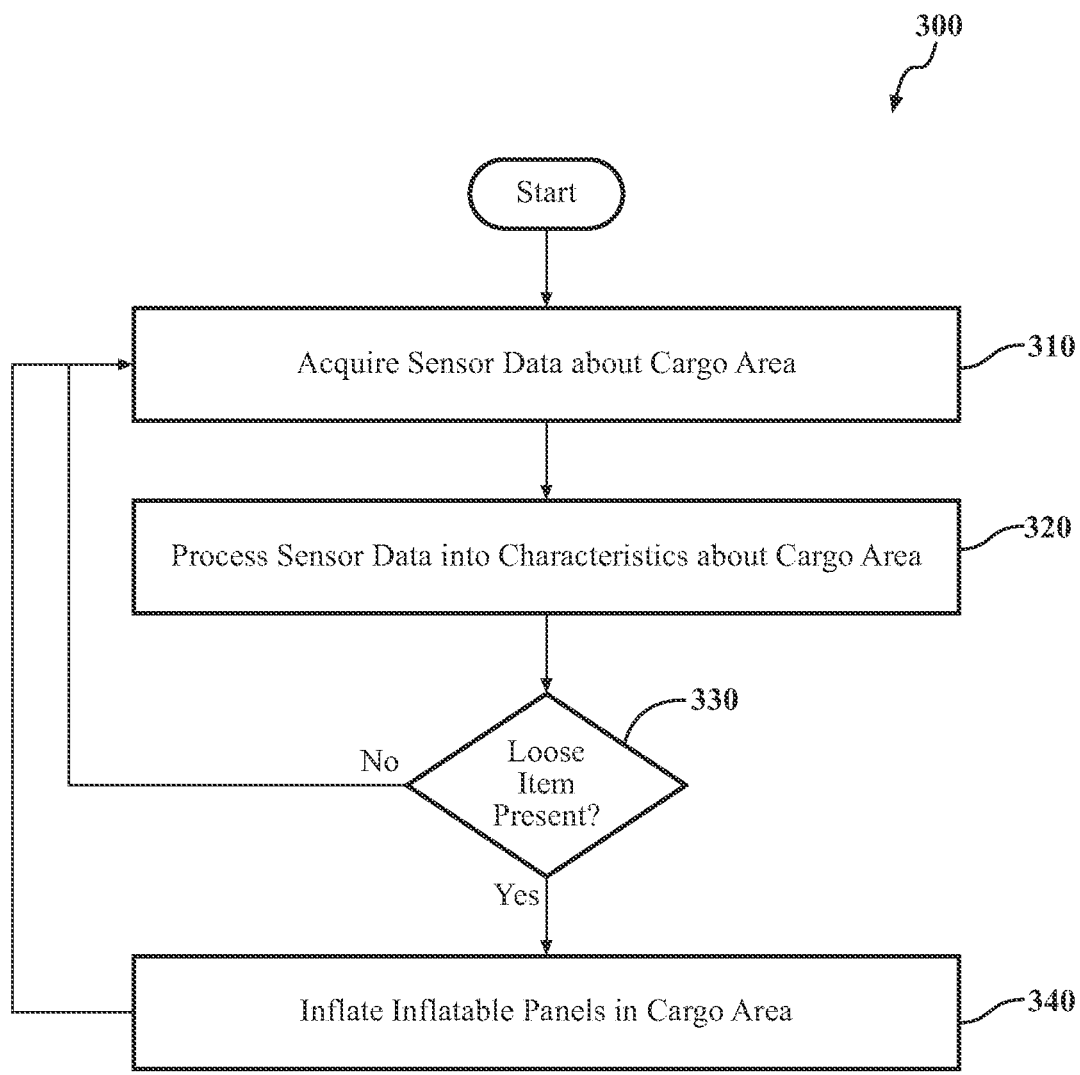
FIG. 3 illustrates one embodiment of a method that is associated with securing cargo in a cargo area of a vehicle using inflatable panels.

Additional aspects of securing an item in a cargo area of a vehicle will be discussed in relation to FIG. 3. FIG. 3 illustrates a flowchart of a method 300 that is associated with securing an item in a cargo area. Method 300 will be discussed from the perspective of the inflation system 110 of FIGS. 1 and 2. While method 300 is discussed in combination with the inflation system 110, it should be appreciated that the method 300 is not limited to being implemented within the inflation system 110 but is instead one example of a system that may implement the method 300.

At 310, the control module 230 controls the sensors 150 to acquire the sensor data 240 about the cargo area 130. In one embodiment, the control module 230 controls sensors 150 located in the cargo area 130, such as sensors 150 located in or attached to the walls of the cargo area 130, the ceiling of the cargo area 130, or the floor of the cargo area 130. Further, in one arrangement, the control module 230 controls sensors 150 located in the one or more inflatable panels 120 or sensors 150 that are part of a mobile device. As part of controlling the sensors 150 to acquire the sensor data 240, it is generally understood that the sensors 150 acquire the sensor data 240 of a region associated with the cargo area 130 with data acquired from different types of sensors generally overlapping in order to provide for a comprehensive sampling of the cargo area 130. The sensor data 240 associated with the cargo area 130 includes, for example, data related to an item in the cargo area 130 or data related to the cargo area 130 itself. In general, the sensor data 240 need not be of the exact same bounded region in the cargo area 130 but should include a sufficient area of overlap such that distinct aspects of the area can be correlated. Thus, the control module 230, in one embodiment, controls the sensors 150 to acquire the sensor data 240 of the cargo area 130.

Moreover, in further embodiments, the control module 230 controls the sensors 150 to acquire the sensor data 240 at successive iterations or time steps. Thus, the inflation system 110, in one embodiment, iteratively executes the functions discussed at blocks 310-320 to acquire the sensor data 240 and provide information therefrom. Furthermore, the control module 230, in one embodiment, executes one or more of the noted functions in parallel for separate observations in order to maintain updated perceptions. Additionally, as previously noted, the control module 230, when acquiring data from multiple sensors, fuses the data together to form the sensor data 240 and to provide for improved determinations of detection, location, and so on.

At 320, the control module 230 processes the sensor data 240 into characteristics about the cargo area 130. In one arrangement the control module 230 processes the sensor data 240 by using a machine learning algorithm embedded within the control module 230, such as a convolutional neural network (CNN), to perform semantic segmentation over the sensor data 240 from which the cargo area 130 and its contents are identified and extracted. Of course, in further aspects, the control module 230 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. The control module 230, in one approach, generates semantic labels for the separate object classes in the image by employing machine learning algorithms for performing, for example, instance segmentation or panoptic segmentation. Whichever particular approach the control module 230 implements, the control module 230 provides an output with semantic labels identifying characteristics about the cargo area 130 and an item in the cargo area 130. In one arrangement, the control module 230 processes the sensor data 240 by extracting features from acquired image, radar, ultrasonic, and/or video data. The control module 230, in one embodiment, processes the image data to identify specific structures in the cargo area 130, such as the presence of the item, the location of the item, the dimensions of the item, the location of inflatable panels 120 in relation to the item, and so on. For example, the control module 230 may process the image data to identify that the item is on the far-right side of the cargo area 130 with dimensions of 10×11×12 inches, and on the right-hand side of the far-right inflatable panel located on the floor of the cargo area 130.

At 330, the control module determines whether a loose item is present in the cargo area 130. The item is loose if, for example, the item is free to move as the vehicle 100 travels. If the item is not loose (i.e., secure) or if no item is present in the cargo area 130, the control module 230 continues to acquire and process sensor data 240 about the cargo area 130 as discussed at blocks 310-320. Otherwise, the control module 230 inflates an inflatable panel 120 to secure the item in the cargo area 130 as discussed at block 340.

At 340, in response to identifying the location and the presence of the loose item in the cargo area 130, the control module 230 inflates an inflatable panel 120 in the cargo area 130 to secure the item. In one embodiment, the control module 230 determines that the inflatable panel 120 is a shortest distance to the item in comparison to one or more additional inflatable panels 120 in the cargo area 130 and selects the inflatable panel 120 that is the shortest distance to the item to inflate. For example, if the item is on the far-left side of the cargo area 130 and the inflatable panels 120 in the cargo area 130 are evenly spaced in a row across the floor of the cargo area 130, the control module 230 determines that the inflatable panel 120 on the far-left side of the floor is the shortest distance to the item, and as such, the control module 230 inflates the far-left inflatable panel 120. As another example, if the item is located on the front end of the far-right side of the cargo area 130 and the inflatable panels 120 are located on each of the four corners of the cargo area 130, the control module 230 inflates the inflatable panel 120 located at the front right corner of the cargo area 130 to secure the item. In one arrangement, the control module 230 is informed of the location of the item from the sensor(s) that are part of the one or more inflatable panels 120. For example, where the sensors 150 in the inflatable panels 120 are radar and/or camera sensors, the control module 230 analyzes the radar/image data of the sensors 150 to determine which inflatable panel 120 the shortest distance to the item.

In one arrangement, the control module 230 inflates the inflatable panel 120 by controlling the supply device 140 to fill the inflatable panel 120 to a threshold pressure that is sufficient to secure the item. Securing the item includes inflating the inflatable panel 120 to a pressure that results in the inflatable panel 120 preventing the item from moving while the vehicle 100 is underway. In one embodiment, the threshold pressure is based, at least in part, on the sensor data 240 indicative of the dimensions of the item. For example, the control module 230, in one embodiment sets the threshold pressure for larger items to be lower than for smaller items because smaller items are more likely to shift during vehicle travel. In one embodiment, the threshold pressure is set by an input from a user. In one approach, the user sets the threshold pressure by entering an input on an HMI, pressing a button, flipping a switch, or the like within the vehicle 100 or directly on the supply device. The user, in one embodiment, may generate an input for the control module 230 on an HMI indicative of the dimensions and the location of the item in the cargo area 130. Accordingly, based on the generated input, the control module 230 selects the closest inflatable panel 120 to the item and inflates the inflatable panel 120 to the appropriate threshold pressure. In one arrangement, the user selects the threshold pressure from a list of preset threshold pressures. For example, in one arrangement, the user has an option to fill the inflatable panel 120 to a level one threshold pressure, a level two threshold pressure, a level three threshold pressure, etc., where each subsequent level corresponds to a higher threshold pressure for the inflatable panel 120.

In one approach, the control module 230 may identify one or more additional objects in the cargo area 130. Accordingly, the control module 230, in one or more embodiments, inflates at least one additional inflatable panel 120 to secure the one or more objects. As previously discussed, the control module 230, in one configuration, determines which inflatable panel 120 is the shortest distance to the additional object and selects the inflatable panel 120 that is the shortest distance to the additional object to inflate. Moreover, the control module 230 inflates the additional inflatable panel 120 to a threshold pressure sufficient to secure the additional object in the cargo area 130.

In one arrangement, the control module 230 determines that an additional object can be secured by the inflatable panel 120 securing the first item. The control module 230 determines that an additional object may be secured by the inflatable panel 120 securing the first item if, for example, the additional object is adjacent to the first item, a similar size as the first item, a shortest distance to the inflatable panel 120, and capable of being secured by the inflatable panel 120. For example, if the item and the additional object are placed on the far-left side of the cargo area 130, the first item is 6×6×5 inches and the second item is 6×7×5 inches, and the inflatable panel 120 that is the shortest distance to both items is the inflatable panel 120 on the far-left side of the floor of the cargo area 130, the control module 230 inflates the inflatable panel 120 on the far-left side of the floor to secure both the item and the object.

Responsive to inflating an inflatable panel 120 to secure an item, the control module 230 continues to monitor the state of the item while the vehicle 100 is underway by acquiring and processing sensor data 240 about the cargo area 130 as discussed in blocks 310-330. If the item is loose, the control module 230 inflates an additional inflatable panel 120 into contact with item and/or increases the pressure of the inflatable panel 120 to secure the item as discussed in block 340. In one approach, the control module 230 monitors the state of the item by acquiring motion data about the cargo area 130 and processing the motion data to determine whether the item is loose or secure. The control module 230 may determine that the item is loose if the item is rattling, swaying, changing positions, or otherwise moving. In contrast, the control module 230 may determine that the item is secure if the item is still while the vehicle 100 is underway. In one embodiment, the control module 230 determines whether the item is loose by acquiring image data about the cargo area 130 and processing the image data to determine that the item has changed positions at different points of time during travel. As another example, the control module 230, in one configuration, determines that the item is loose by acquiring and processing radar and/or sonar data about the cargo area 130 to determine that the item has changed positions. In one approach, the control module 230 determines that the item is loose if sensor data 240 from sensors 150 integrated within the inflatable panel 120 indicate that the inflatable panel's shape is changing. For example, where the sensor data acquired from the inflatable panel 120 is image data, the control module 230 may determine that the item is loose if the perspective of the camera(s) attached to the inflatable panel 120 changes (e.g., moves up/down) as a result of the item continuously pushing against and moving away from the inflatable panel 120 while the vehicle 100 is underway.

In any case, responsive to identifying that the item is loose or moving, the control module 230, in one arrangement, inflates at least one additional inflatable panel 120 into contact with the item to secure the item. As an example, if the control module 230 determines that the item shifts laterally (i.e., the item is loose) when the vehicle 100 turns, the control module 230 inflates an inflatable panel 120 on the left and/or the right side of the item to prevent the item from shifting laterally. In one approach, the control module 230 inflates the additional panel 120 that is a shortest distance to the item if more than one inflatable panel 120 is available to prevent further movement of the loose item. Alternatively, or additionally to inflating an additional inflatable panel 120, the control module 230, in response to identifying that the item is loose, increases the pressure of the inflatable panel 120 by controlling the supply device 140 to fill the inflatable panel 120 with additional water, pre-condensed air, or compressed air. For example, if the item is rattling (i.e., the item is shaking and striking a surface of the cargo area 130 and the inflatable panel 120 repeatedly) while the vehicle 100 is underway but is otherwise not moving, the control module 230 controls the supply device 140 to increase the pressure of the inflatable panel 120 until the item is not rattling. In one approach, the control module 230 determines an appropriate pressure to inflate the inflatable panel 120 to based on the movement of the loose item. Accordingly, the control module 230, in one embodiment, automatically increases the pressure of the inflatable panel 120 to the appropriate pressure to secure the item when the item is loose. In one arrangement, the control module 230 incrementally increases the pressure of the inflatable panel 120 until the item is no longer loose. For example, in one approach, the control module 230 inflates the inflatable panel 120 in increments of 1, 2, 5, etc. pounds per square inch (psi) until the item is secure.

In one arrangement, the control module 230 streams the sensor data 240 about the cargo area 130, such as image and video data of the cargo area 130, onto a display in the vehicle 100 or on a mobile device of a user. Accordingly, a user may monitor the cargo area 130 using the display. If the user identifies that the item is loose or has otherwise moved, the user may generate an electronic input on an HMI within the vehicle 100 or on a mobile device to cause the control module 230 to inflate an additional panel 120 and/or to increase the pressure of the inflatable panel 120. In one embodiment, the user selects which additional inflatable panel(s) 120 in the cargo area to inflate by generating an electronic input on an HMI. The user may also select the pressure to inflate the inflatable panel 120 to by generating an electronic input on an HMI, by generating an input on a knob, or the like. In one embodiment, the user may further use the HMI to generate electronic inputs that cause the inflatable panel 120 to deflate or decrease in pressure. For example, if the user determines that the item is being held too tightly (e.g., the item is being damaged by the inflatable panel 120), the user may generate an input that causes control module 230 to decrease the pressure of the inflatable panel 120 to a set amount or by a certain value.

In one embodiment, the control module 230 inflates the inflatable panel 120 according to a predicted state of the vehicle 100. The control module 230, in one arrangement, generates a predicted state of the vehicle 100 along a route, where the predicted state of the vehicle 100 may include a speed, a steering angle, a braking maneuver, etc., the vehicle 100 will execute along the route. The control module 230 may generate the predicted state of the vehicle 100 by, for example, receiving navigation data associated with the vehicle 100. Navigation data includes, for example, data about a route the vehicle 100 is taking (e.g., the terrain, maneuvers that will be executed along the route, etc.) and/or a trajectory the vehicle 100 is planning to execute along a route. In one approach, the control module 230 generates predicted states of the vehicle 100 at inflection points along the route. Inflection points, in one embodiment, correspond to the vehicle 100 executing a maneuver that satisfies a threshold g-force applied to the item, where the threshold g-force is a g-force that results in movement of the item in the cargo area 130. For example, a threshold g-force may be generated in response to the vehicle 100 braking, accelerating, and/or decelerating. As an example, if the navigation data indicates that the vehicle 100 will stop at a stop sign in one mile (i.e., where the stopping corresponds to an inflection point), the control module 230 determines that the vehicle state in one mile is a complete stop and that the state of the vehicle 100 leading up to the stop sign includes braking and decelerating of the vehicle 100 (i.e., where the braking and decelerating corresponds to an inflection point). The control module 230, in one embodiment, generates the predicted state of the vehicle 100 according to upcoming turns the vehicle 100 will execute, where the turns of the vehicle 100 result in the item experiencing a threshold g-force.

In one configuration, the control module 230 generates a near-future predicted state of the vehicle 100 by acquiring and processing inertial measurement unit (IMU) data indicative of upcoming maneuvers the vehicle 100 will execute. IMU data includes, in one or more arrangements, data, such as the acceleration of the vehicle 100, the speed of the vehicle 100, and the steering angle of the vehicle 100. For example, if the IMU data indicates that the vehicle 100 is decelerating, the control module 230 generates a predicted state of the vehicle 100 that corresponds to the vehicle 100 coming to a stop, decreasing its speed, or executing a turning maneuver. In one embodiment, the control module 230 generates the predicted state of the vehicle 100 in response to the activation of a turn signal of the vehicle 100. As an example, if the user engages the left turn signal, the control module 230 determines that the vehicle 100 will be turning left. The control module 230 may further generate the predicted state of the vehicle 100 based on user-generated inputs. For example, a user may indicate upcoming driving maneuvers on an HMI and based on the upcoming driving maneuvers, the control module 230 generates the predicted state of the vehicle 100.

Based on the predicted state of the vehicle 100, the control module 230 determines a predicted movement of the item according to the predicted state of the vehicle 100. Movement of the item can include lateral movement, longitudinal movement, or upward/downward movement. For example, the control module 230 may generate a predicted state of the vehicle 100 associated with the vehicle 100 making a sharp right turn, and as such, the control module 230 determines that the item is likely to shift to the left of the vehicle 100. As another example, the control module 230 may generate a predicted state of the vehicle 100 associated with the vehicle 100 braking or decelerating, and as such, the control module 230 determines that the item is likely to shift towards a front end of the vehicle 100 in the cargo area 130. As yet another example, the control module 230 may generate a predicted state of the vehicle 100 associated with the vehicle 100 traversing hills or uneven areas of a road, and accordingly, the control module 230 determines that the item is likely to move up/down. In response to determining the predicted movement of the item, the control module 230, in one embodiment, prevents the item from executing the predicted movement by inflating at least one additional inflatable panel 120 into contact with the item and/or by increasing the pressure of the inflatable panel 120.

As an example, if the control module 230 determines that the item will shift left as a result of the generated predictive path of the vehicle 100, the control module 230 may inflate an additional inflatable panel 120 on the left side of the item or increase the pressure of the inflatable panel 120 to prevent the item from moving. As another example, if the control module 230 determines that the item will shift to a front end of the cargo area 130 as a result of the generated predicted path of the vehicle 100, the control module 230 inflates an additional inflatable panel 120 in front of the item and/or increases the pressure of the inflatable panel 120. As a further example, if the control module 230 determines that the item will move up/down, the control module 230 may increase the pressure of the inflatable panel 120 and/or inflate an additional inflatable panel 120 located above the item in the corner of or on the ceiling of the cargo area 130. In any case, the control module 230 prevents predicted movements of an item in the cargo area 130 by inflating additional inflatable panels 120 and/or by increasing the pressure of the inflatable panel 120. In this way, the control module 230 improves the prevention of cargo movement in a cargo area.

Figure 4:
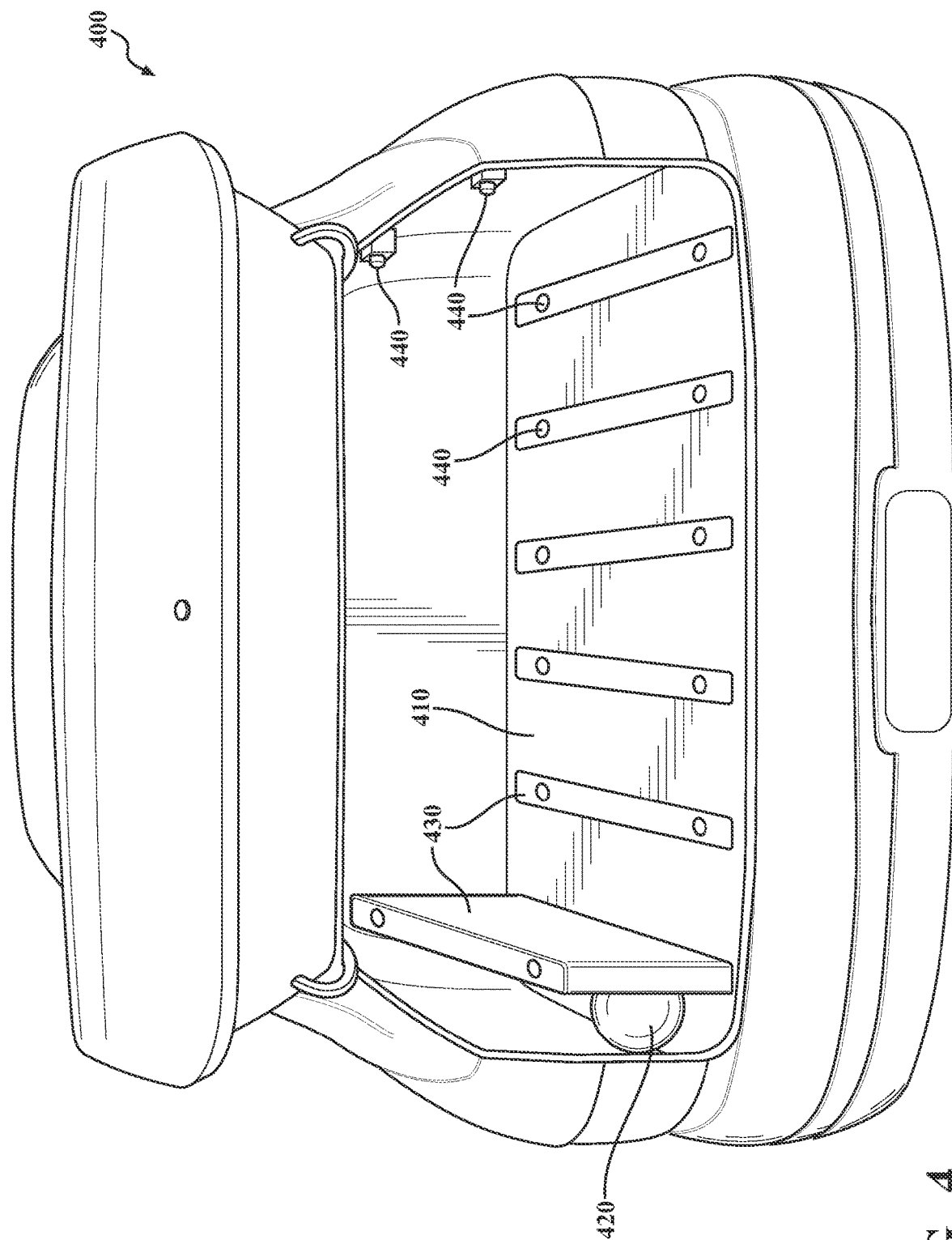
FIG. 4 illustrates a three-dimensional (3D) view of a cargo area in which inflatable panels secure an item in the cargo area.

A further explanation of how the inflation system 110 improves the prevention of cargo movement in a cargo area will now be discussed in relation to FIG. 4. FIG. 4 illustrates a three-dimensional (3D) view of a vehicle 400 that includes a cargo area 410 that is associated with securing an item 420 using inflatable panels 430. As illustrated, the cargo area 410 includes a plurality of inflatable panels 430 arranged along the floor of the cargo area 410. As previously discussed, it should be understood that while FIG. 4 illustrates the inflatable panels 430 as being evenly spaced along the floor, the inflatable panels 430 may be arranged in a formation sufficient to secure the item 420 within the cargo area 410. For example, the inflatable panels may be attached to the corners, the walls, or the ceiling of the cargo area 410. Moreover, while FIG. 4 illustrates the cargo area 410 as including six inflatable panels 430, any suitable number of inflatable panels 430 may be included in the cargo area 410. In any case, the inflatable panel 430 on the far-left side of the cargo area 410 is inflated to secure the item 420 in the cargo area 410. As previously described, the inflation system 110, in one embodiment, inflates the inflatable panel 430 in response to identifying the location and the presence of the item 420, and further, in response to identifying that the inflatable panel 430 is the shortest distance to the item 420 in comparison to the other inflatable panels 430 in the cargo area 410. The cargo area 410 further includes sensors 440 attached to the walls of the cargo area 410 and integrated into the inflatable panels 430. In one arrangement, the sensors 440 are cameras, radars, sonars, or any sensor suitable for acquiring motion and/or position data about the item 420. The sensors 440, in one configuration, inform the inflation system 110 of the state of the item 420 while the vehicle is underway. In this way, the inflation system 110 improves securing items in a cargo area of a vehicle.

FIG. 1 will now be discussed in full detail as an example environment within which the system and methods disclosed herein may operate. The vehicle 100 can include one or more processors 210. In one or more arrangements, the processor(s) 210 can be a main processor of the vehicle 100. For instance, the processor(s) 210 can be an electronic control unit (ECU), and application specific integrated circuit (ASIC), a microprocessor, etc.

The vehicle 100 can include one or more modules, at least some of which are described herein. The modules can be implemented as computer-readable program code that, when executed by a processor 210, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively, or in addition, data store 250 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB. AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An inflation system, comprising:
one or more processors; and
a memory communicably coupled to the one or more processors and storing instructions that, when executed by the one or more processors, cause the one or more processors to:
acquire sensor data about a cargo area of a vehicle from at least one sensor;
identify a presence and a location of an item in the cargo area according to the sensor data; and
inflate an inflatable panel to secure the item in the cargo area.

2. The inflation system of claim 1, wherein the instructions to identify the item further include instructions to:
monitor a state of the item to determine when the item is loose; and
responsive to identifying that the item is loose, inflate at least one additional inflatable panel into contact with the item to secure the item in the cargo area when the item is loose.

3. The inflation system of claim 1, wherein the instructions to identify the item further include instructions to:
monitor a state of the item to determine when the item is loose; and
increase a pressure of the inflatable panel to secure the item in the cargo area when the item is loose.

4. The inflation system of claim 1, wherein the instructions to identify the presence and the location of the item further include instructions to:
identify one or more objects in the cargo area; and
inflate at least one additional inflatable panel to secure the one or more objects.

5. The inflation system of claim 1, wherein the instructions further include instructions to generate a predicted state of the vehicle over a route, wherein the predicted state of the vehicle includes at least one of: a speed, a steering angle, and a braking maneuver the vehicle will execute along the route; and
determine a predicted movement of the item according to the predicted state of the vehicle.

6. The inflation system of claim 5, wherein the instructions further include instructions to in response to determining the predicted movement of the item, prevent the item from executing the predicted movement by at least one of: inflating at least one additional panel into contact with the item and increasing a pressure of the inflatable panel.

7. The inflation system of claim 1, wherein the instructions to inflate the inflatable panel includes instructions to:
determine the inflatable panel is a shortest distance to the item in comparison to one or more additional inflatable panels in the cargo area; and
select the inflatable panel that is the shortest distance to the item to inflate into contact with the item.

8. The inflation system of claim 1, wherein a location of the inflatable panel is movable, and
wherein the location of the inflatable panel moves in response to disconnecting the inflatable panel from a first housing in the cargo area and connecting the inflatable panel to a second housing in the cargo area.

9. A non-transitory computer-readable medium including instructions that when executed by one or more processors cause the one or more processors to:
acquire sensor data about a cargo area of a vehicle from at least one sensor;
identify a presence and a location of an item in the cargo area according to the sensor data; and
inflate an inflatable panel to secure the item in the cargo area.

10. The non-transitory computer-readable medium of claim 9, wherein the instructions to identify the item further include instructions to:
monitor a state of the item to determine when the item is loose; and
inflate at least one additional inflatable panel into contact with the item to secure the item in the cargo area when the item is loose.

11. The non-transitory computer-readable medium of claim 9, wherein the instructions to identify the item further include instructions to:
monitor a state of the item when the item is loose; and
increase a pressure of the inflatable panel to secure the item in the cargo area when the item is loose.

12. The non-transitory computer-readable medium of claim 9, wherein the instructions further include instructions to generate a predicted state of the vehicle over a route, wherein the predicted state of the vehicle includes at least one of: a speed, a steering angle, and a braking maneuver the vehicle will execute along the route; and
determine a predicted movement of the item according to the predicted state of the vehicle.

13. The non-transitory computer-readable medium of claim 12, wherein the instructions further include instructions to in response to determining the predicted movement of the item, prevent the item from executing the predicted movement by at least one of: inflating at least one additional panel into contact with the item and increasing a pressure of the inflatable panel.

14. A method, comprising:
acquiring sensor data about a cargo area of a vehicle from at least one sensor;
identifying, using a processing device, a presence and a location of an item in the cargo area according to the sensor data; and
inflating an inflatable panel to secure the item in the cargo area.

15. The method of claim 14, wherein identifying the item further includes monitoring a state of the item to determine when the item is loose; and
inflating at least one additional inflatable panel into contact with the item to secure the item in the cargo area when the item is loose.

16. The method of claim 14, wherein identifying the item further includes monitoring a state of the item to determine when the item is loose; and
increasing a pressure of the inflatable panel to secure the item in the cargo area when the item is loose.

17. The method of claim 14, wherein identifying the presence and the location of the item further includes identifying one or more objects in the cargo area, and
inflating at least one additional inflatable panel to secure the one or more objects.

18. The method of claim 14, further comprising generating a predicted state of the vehicle over a route, wherein the predicted state of the vehicle includes at least one of: a speed, a steering angle, and a braking maneuver the vehicle will execute along the route; and
determining a predicted movement of the item according to the predicted state of the vehicle.

19. The method of claim 18, further comprising:
in response to determining the predicted movement of the item, preventing the predicted movement by at least one of: inflating at least one additional panel into contact with the item and increasing a pressure of the inflatable panel.

20. The method of claim 14, wherein inflating the inflatable panel includes:
   determining the inflatable panel is a shortest distance to the item in comparison to one or more additional inflatable panels in the cargo area; and
   selecting the inflatable panel that is the shortest distance to the item to inflate into contact with the item.

\* \* \* \* \*